Fig.1

No. 741,560. PATENTED OCT. 13, 1903.
H. C. SMITH.
CASEMENT WINDOW.
APPLICATION FILED JUNE 30, 1902.
NO MODEL. 8 SHEETS—SHEET 2.

Fig. 2.

WITNESSES: INVENTOR:

No. 741,560. PATENTED OCT. 13, 1903.
H. C. SMITH.
CASEMENT WINDOW.
APPLICATION FILED JUNE 30, 1902.
NO MODEL. 8 SHEETS—SHEET 7.

FIG. 8.

WITNESSES: INVENTOR:

Fig. 9.

No. 741,560. Patented October 13, 1903.

UNITED STATES PATENT OFFICE.

HENRY C. SMITH, OF BOSTON, MASSACHUSETTS, ASSIGNOR TO SMITH-WARREN COMPANY, OF BOSTON, MASSACHUSETTS, A CORPORATION OF MASSACHUSETTS.

CASEMENT-WINDOW.

SPECIFICATION forming part of Letters Patent No. 741,560, dated October 13, 1903.

Application filed June 30, 1902. Serial No. 113,759. (No model.)

*To all whom it may concern:*

Be it known that I, HENRY C. SMITH, a citizen of the United States, residing at Boston, in the county of Suffolk and State of Massachusetts, have invented a new and useful Improvement in Casement-Windows, of which the following is a full, clear, and exact description, reference being had to the accompanying drawings, forming a part of this specification, in explaining its nature.

My invention relates to an improvement in casement-windows which consists in providing the window with means by which the same may be automatically closed or be retained in a normally closed position, in providing the window with means by which the same may be retained in an adjusted open position, and in providing means by which the window may be automatically released by heat in case of fire to become closed.

The features of construction may best be seen and understood by reference to the drawings, where—

Figure 1:
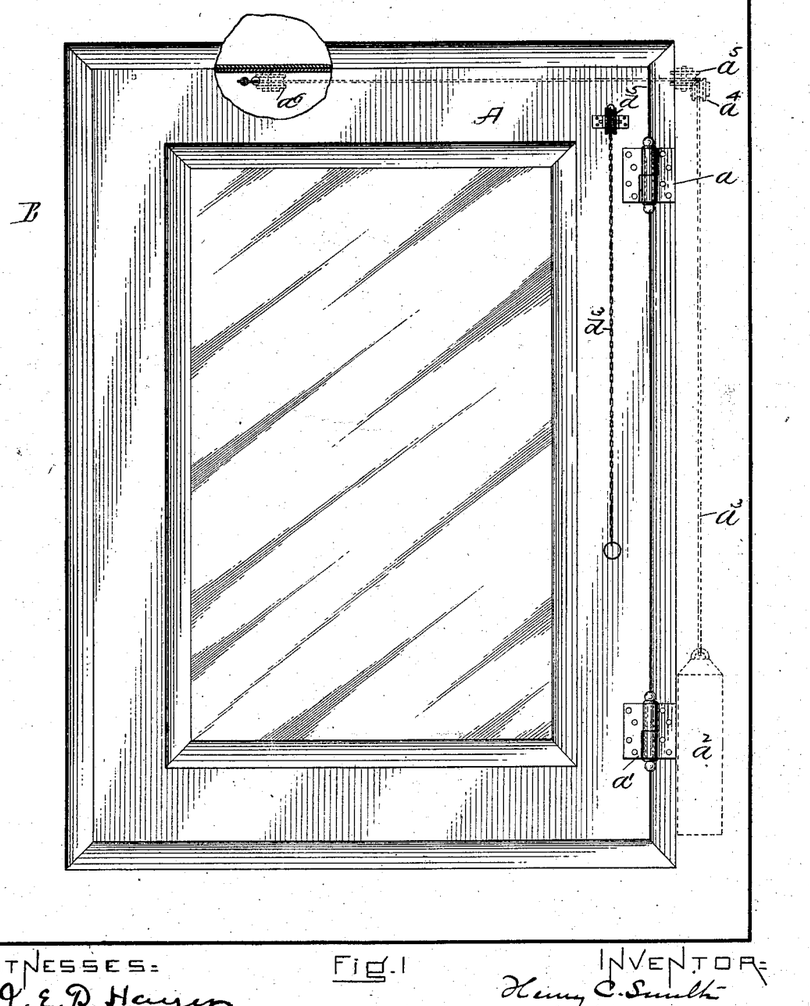
Figure 1 shows the window in front elevation.
Figure 2:
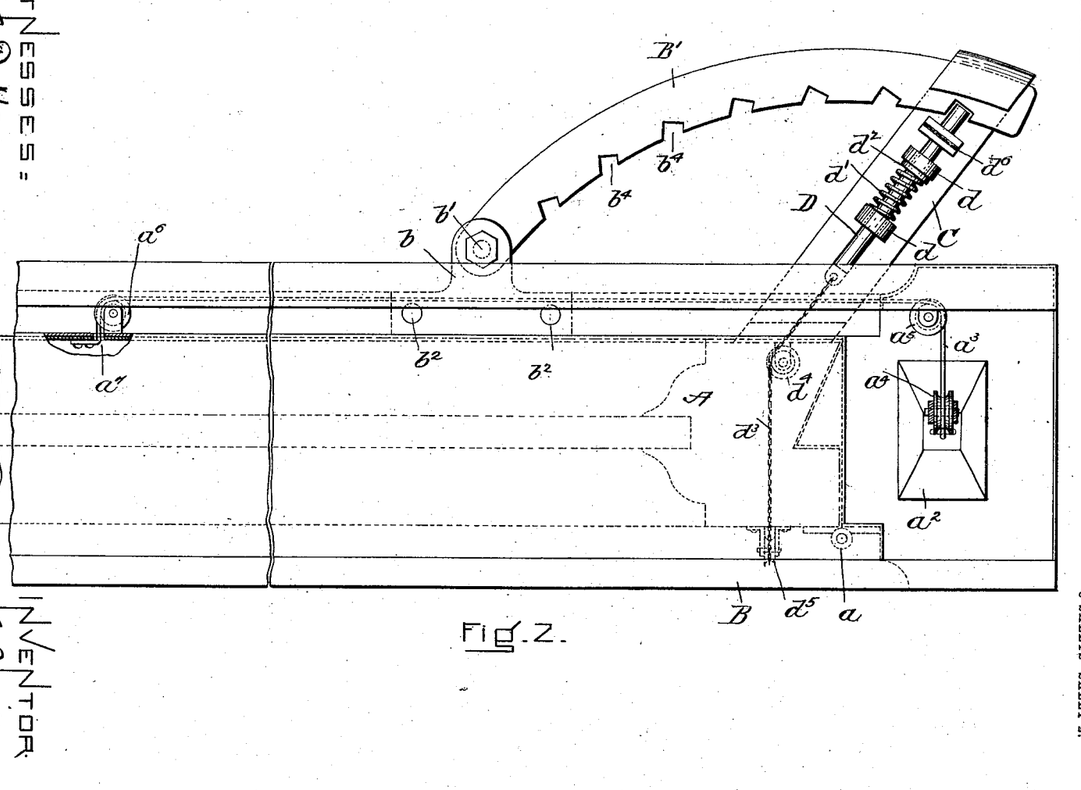
Fig. 2 is an enlarged plan of the means for adjustment.
Figure 5:
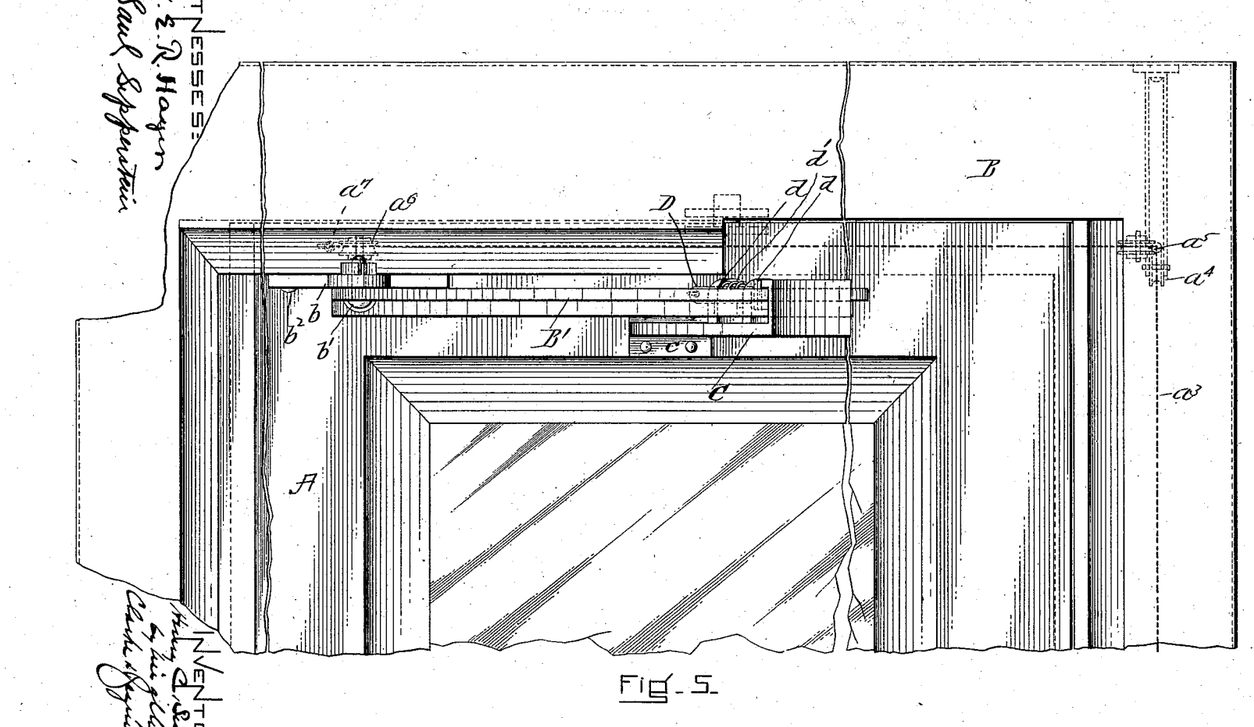
Fig. 5 shows in elevation the means for adjustment.

Referring to the drawings, A represents the window-sash; B, the frame. Both are preferably made of sheet metal. The sash A is attached to the sides of the frame by hinges $a\, a'$, and so is adapted to swing open with horizontal movement. It retains a normally closed position, however, by the drawing strain of the weight $a^2$ acting through the connecting cord or chain $a^3$. For obtaining such normally closed adjustment of the window the chain $a^3$ may have any suitable order of arrangement. I have shown it, as may best be seen in Figs. 2 and 5, extending from the weight $a^2$ within the frame-casing up over a vertical pulley $a^4$ to the pulley $a^5$, both pulleys being so arranged and with such relative bearing to the pulley $a^6$, likewise attached to the interior of the frame, that the chain will be extended along the interior of the head of the frame and after turning about the pulley $a^6$ will pass through the frame to make engagement with the sash, or rather the upper rail of the sash, at the point $a^7$. When the sash is pulled open, the weight $a^2$ will be drawn up. When the sash is released, the gravitating weight automatically draws the sash to a closed position. This order of arrangement is especially good, for not only is the weight concealed within the frame, but the connecting-cord also by being for the most part contained within the frame is protected by its metal shell. Furthermore, the cord is made of some heat-resisting material, which insures its intactness in case of fire.

Figures 3, 4:
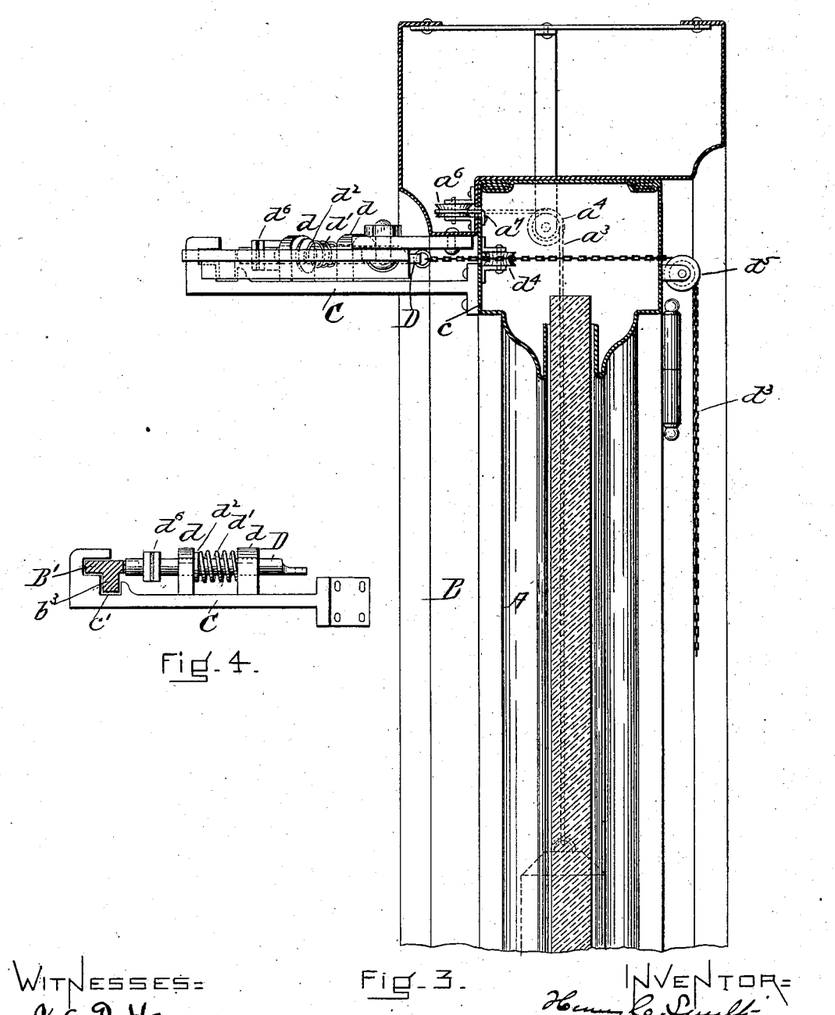
Fig. 3 is a vertical section of a part of the sash.
Fig. 4 shows a detail of which mention will hereinafter be made.

In order that the sash may be held open against its tendency to automatically close, I have extended the arm B' from the head of the frame. This arm makes a pivotal attachment in order that it may have some degree of lateral movement and instead of being secured directly to the frame is pivoted to the reinforcing and holding piece $b$ by the pin $b'$. The interposed piece $b$ is rigidly attached to the molding at the head of the frame by rivets or bolts $b^2$. The arm B' forms a slight arc. It has along its under side a reinforcing rib or bead $b^3$ (see Fig. 4) and along its interior side a series of notches $b^4$, which are cut to correspond with the degree of the window's opening.

Extending from the sash to engage with the arm B' is the adjusting member C, which is rigidly secured to the upper cross-rail of the sash at the point $c$. (See Fig. 3.) The member extends out obliquely, as represented, and is turned at its end to clasp around and so furnish a housing or guide for the arm B'. By reason of its rigid attachment to the sash the adjusting member is made to move through the arc of a circle, the end of the member conjoining with the arm by describing a curve corresponding with its arc formation. As the end of the adjusting member moves along the arm during the opening and closing of the sash it is guided and its movement is facilitated by the ribbed section $b^3$ of the arm being continued in the grooved section $c'$ of the adjusting member. The turned end of the adjusting member prevents disengagement, while the pivotal mounting of the arm compensates for any inequalities in the length of the adjusting member as it is moved by the opening or closing of the sash from a mean central point.

The adjusting member C is locked to the arm B' by means of the ratchet D, adapted to fasten into the notches $b^4$ out along its interior edge. The ratchet takes the form of a bolt, which is held in place by the lugs $d$ extending from the adjusting member and is retained normally projected by means of the tension-spring $d'$ encircling the bolt and bearing against a shoulder $d^2$ formed upon it, and which shoulder by bearing against the exterior lug $d$ determines the amount of the bolt's projection.

The bolt is withdrawn by means of the cord or chain $d^3$, which by passing over the pulleys $d^4$ $d^5$, attached, respectively, to the interior and exterior of the sash, as represented, becomes extended to an accessible position.

As previously explained, the arrangement of the ratchet or bolt is such that it will catch into any of the notches of the arm, depending upon the degree of opening of the sash, and of course until the bolt is withdrawn the sash will be retained in an adjusted open position. In order, however, that the sash may close automatically in case of fire, I have made the engaging end of the bolt detachable by heat, and this by fixing it to the main body of the bolt by fusible solder. This may best be seen in Figs. 2 and 3, the two sections of the bolt being joined by fusible solder $d^6$. In case of fire the end of the bolt member drops off, and the sash being released is automatically drawn to a closed position by the weight $a^2$, as before explained.

Figure 6:
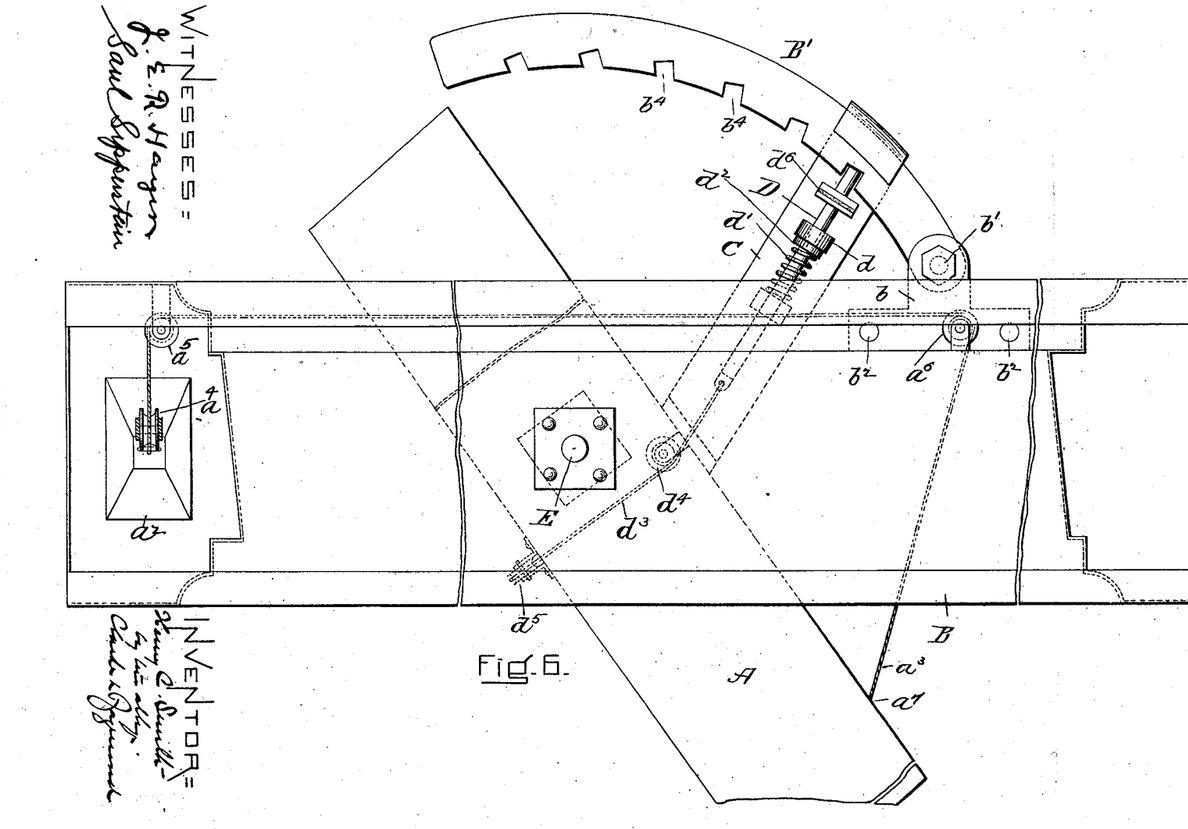
Fig. 6 is an enlarged plan of the means for adjustment in connection with a sash pivotally retained.

In Fig. 6 instead of a hinged casement-window I have shown a window having a sash vertically pivoted at its center to turn horizontally to an open position, any suitable pivotal construction E being employed. The sash assumes a normally closed position, the weight, the connecting-chain, and its pulley combination being practically as before described. For the adjusted open retention of the window the combination of the arm extension B', the adjusting member C, and bolt D is advantageously employed as with the ordinary casement-window.

Figure 7:
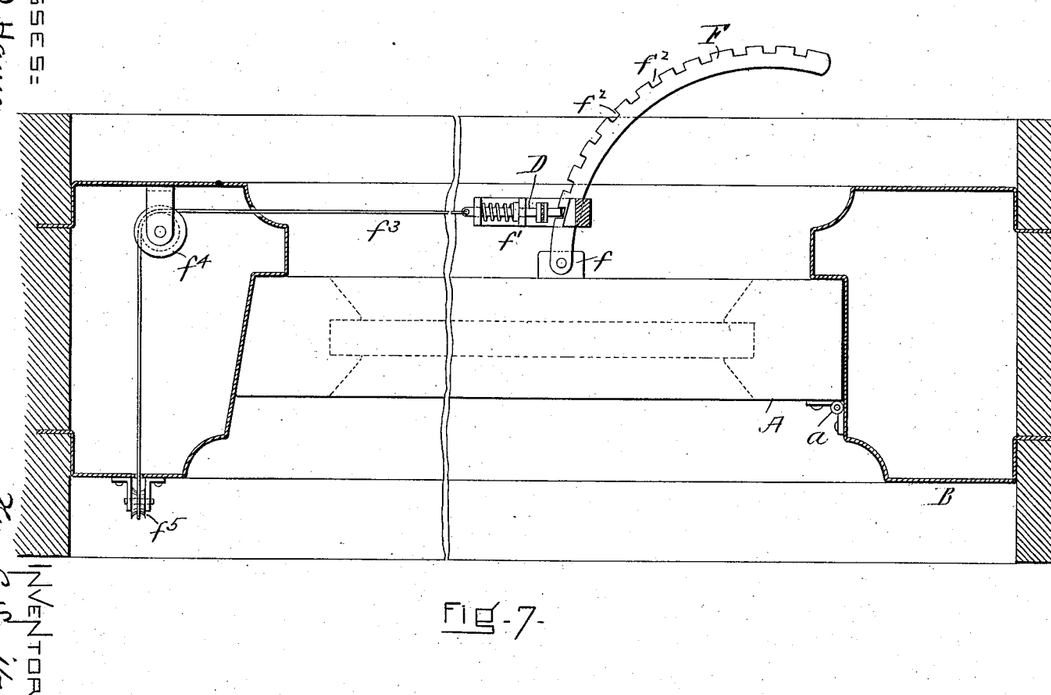
Figs. 7, 8, and 9 show modifications in the means for holding the sash open, with especial reference to its thermostatic release.
Figure 8:
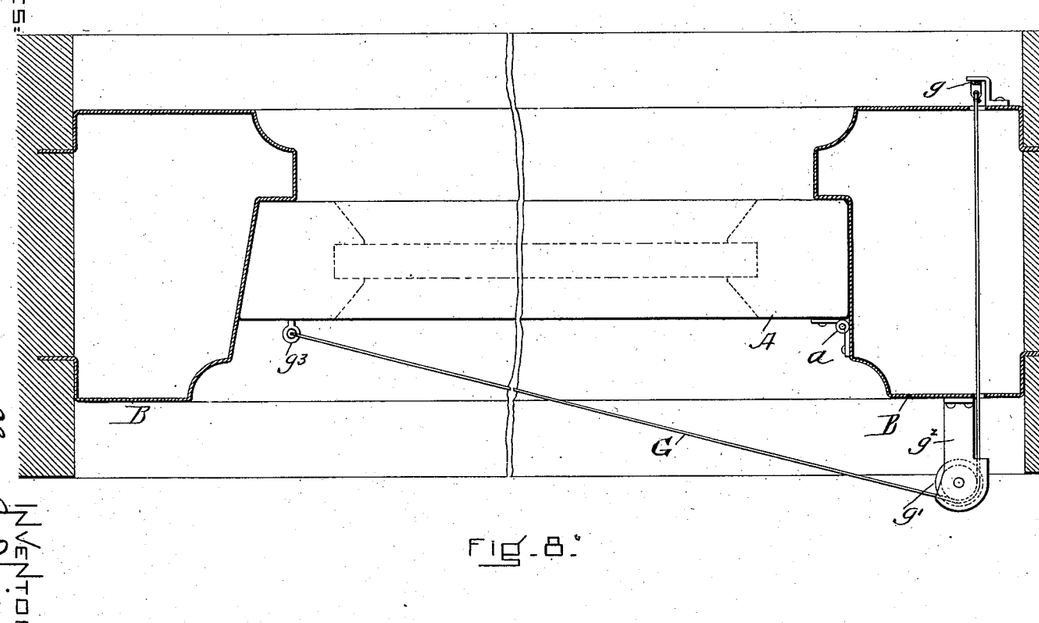
Figure 9:
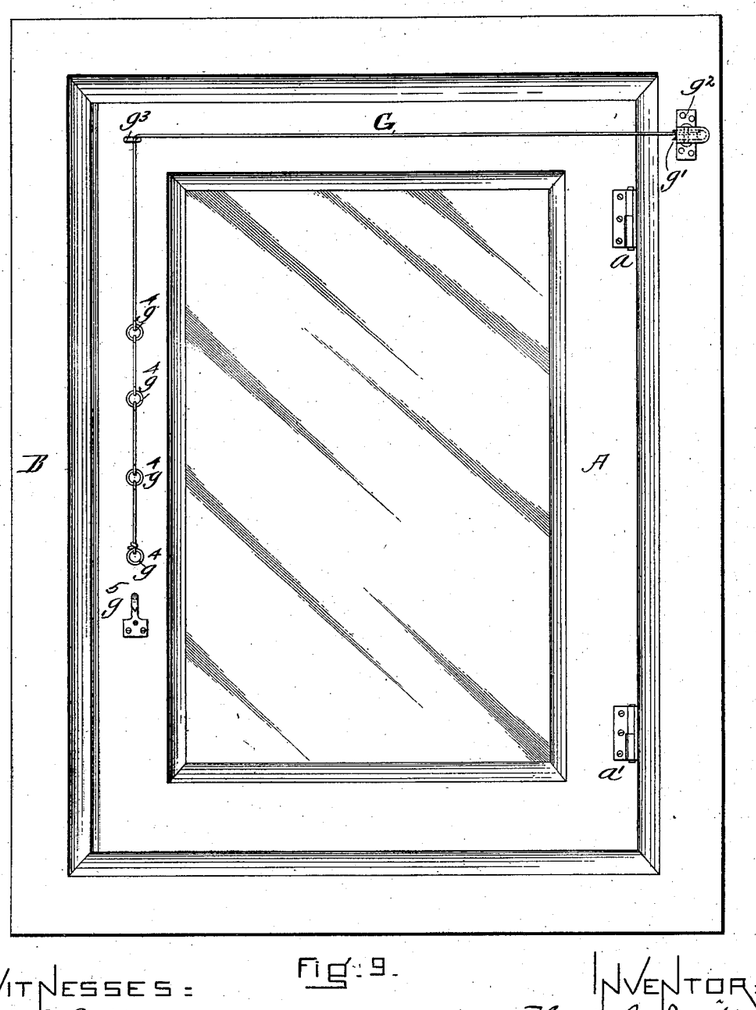

In Figs. 7 and 8 I have shown modified means for holding the sash open, especially with reference to its thermostatic release. In Fig. 7 the sash is held open by the arm F, pivotally attached to it through the clip $f$. The arm is held in place by sliding through the housing $f'$, secured directly to the head of the frame. The ratchet or bolt D is secured to this housing. It is held with a normal but yielding projection, as in the previous construction, and is adapted to engage with any one of the notches $f^2$ cut along the interior edge of the arm, and thus to hold the sash in an adjusted open position. The bolt is withdrawn by the cord $f^3$, which passes along beneath the head of the frame and parallel with it and over the pulley $f^4$ interior the casing. The cord is there extended over the pulley $f^5$ upon the inside face of the frame and down to within convenient reach. The engaging end of the bolt is released by heat, as before explained, when the sash being let go will automatically close, it being provided, of course, with some means by which it would attain to a normally closed position.

In Fig. 8 the sash is held open by the cord G. The cord is fusibly secured to the outer facing of the frame at the point $g$. Thence it passes directly through the frame and over a horizontal pulley $g'$, secured to the arm $g^2$, extending inward from the frame. The cord then makes engagement with the sash by passing through a ring or like member $g^3$ and hangs down within convenient reach. By pulling upon this cord the sash will be drawn open. A series of knots $g^4$ can be made in the cord near its lower end, which are adapted to slip over a hook $g^5$ or other suitable means of retention fixed to the side rail of the sash. By securing one of these knots to the hook the sash will be held in a corresponding open position. In case of fire, the cord fusibly attached to the outer facing of the frame will become released. The cord will then pull through the frame, and the sash being released will automatically close, some means like that of an overbalancing-weight being employed to draw it closed. In so far as this means pertains to a holding open of the sash to a predetermined degree of opening, it would be considered the mechanical equivalent of the means before referred to.

The various means which I have described as comprising my invention are designedly for obtaining the adjustment of some swinging fire-resisting structure. So far I have described the same as pertaining to windows for obtaining the adjustment of their horizontally-swinging sashes; but I do not wish to confine my invention specifically to window-sashes, for it might as well be employed to obtain the adjustment of fire-shutters or like swinging structures, the term "sash" being synonymous with such structures as far as the scope of my invention is concerned.

Having thus fully described my invention, I claim and desire to secure by Letters Patent of the United States—

1. In a window-frame the combination with a horizontally-swinging sash of overbalancing means for holding the same in a normally closed position, and means releasable by heat for holding the same in an adjusted open position against its overbalancing tendency to close comprising a notched arm and a housing therefor through which said arm works, and a spring-pressed bolt releasable by heat for engaging with any one of the notches in said arm depending upon the degree of opening in said sash, substantially as described.

2. In a window-frame the combination with a horizontally-swinging sash of means for retaining said sash at a normally closed position, a notched arm suitably supported for holding the same in an adjusted open position, means furnishing a housing for said arm and a spring-pressed bolt for engaging with any of the notches in said arm whereby the sash may be held open in an adjusted position, the headed end of which bolt is secured to the main body thereof by some fusible material detached by heat, substantially as and for the purposes set forth.

3. In a window-frame the combination with a horizontally-swinging sash of means for retaining said sash in a normally closed position, the notched arm B', the sash-engaging member C for engaging with said arm and furnishing a housing therefor, and the spring-pressed bolt D carried by the sash-engaging member C and adapted to engage with any one of the notches in said arm, substantially as described.

4. In a window-frame, the combination of a horizontally-swinging sash, means for retaining said sash in a normally closed position, an arm having pivotal attachment with the frame-head and having a series of notches along its interior edge, a sash member adapted to conjoin therewith, and a spring-pressed bolt releasable by heat carried by said sash member adapted to fasten into said notches, that the said sash may be retained in an open adjusted position substantially as described.

5. In a window-frame, the combination of a horizontally-swinging sash, means for retaining said sash in a normally closed position, an arm having pivotal attachment with the frame-head and having a series of notches along its interior edge, a sash member adapted to conjoin therewith and furnish a guide or housing therefor, and a spring-pressed bolt carried by said sash member, the headed end of which, detachable by heat, is adapted to fasten into said notches as and for the purposes set forth.

HENRY C. SMITH.

In presence of—
JOHN E. R. HAYES,
SAUL SIPPERSTEIN.